United States Patent [19]

O'Driscoll et al.

[11] 3,859,169

[45] Jan. 7, 1975

[54] ENZYMES ENTRAPPED IN GELS

[75] Inventors: Kenneth F. O'Driscoll, Waterloo, Ontario, Canada; Masatsugu Izu, Troy, Mich.

[73] Assignee: Polymeric Enzymes, Inc., Buffalo, N.Y.

[22] Filed: Apr. 30, 1973

[21] Appl. No.: 355,653

[30] Foreign Application Priority Data

May 3, 1972 Great Britain.................... 20692/72

[52] U.S. Cl............... 195/63, 195/68, 195/DIG. 11, 424/94, 260/112 R
[51] Int. Cl.............................................. C07g 7/02
[58] Field of Search................. 195/63, 68, DIG. 11

[56] References Cited
UNITED STATES PATENTS

| | | | |
|---|---|---|---|
| 3,540,984 | 11/1970 | Deutsch............................ | 195/63 X |
| 3,576,760 | 4/1971 | Gould et al....................... | 195/68 X |
| 3,577,512 | 5/1971 | Shepherd et al.................. | 424/21 |

OTHER PUBLICATIONS

Hicks, et al., The Preparation and Characterization of Lyophilized Polyacrylamide Enzyme Gels for Chemical Analysis, Analytical Chemistry, Vol. 38, No. 6, 1966 (pp. 726–730) QD71I42.

Nilsson, et al., The Use of Bead Polymerization of Acrylic Monomers for Immobilization of Enzymes, Biochimica et Biophysica Acta, Vol. 268, April 7, 1972 (pp. 253–256) QD1B5.

*Primary Examiner*—David M. Naff
*Attorney, Agent, or Firm*—Sim & McBurney

[57] ABSTRACT

Enzymes are provided entrapped in gels. In this form the enzymatic activity is very stable on prolonged use. The gel is formed by polymerization of an aqueous reaction mixture containing enzyme, polymerizable monomer, cross-linking agent for the monomer and a polymer. The gel may be dried to a powder and stored in this form for extended periods without loss of enzymatic activity on reconstitution of the gel.

26 Claims, 2 Drawing Figures

ENZYMES ENTRAPPED IN GELS

FIELD OF INVENTION

This invention relates to the stabilization of enzymes by providing them in a substantially insoluble form.

BACKGROUND TO THE INVENTION

Enzymes are used as catalysts in many industrial processes and analytical techniques. They exhibit a high debree of individual specificity as to substrate, and are highly efficient under mild operating conditions.

However, these materials suffer from a number of drawbacks. In particular, since many free enzymes are soluble in aqueous media, they can only be used once. Additionally, the deactivated enzyme remains in the product as a contaminant, which in certain instances may be undesirable. Enzymes are expensive materials and if the enzyme is lost in the process undertaken, then the process is essentially uneconomic.

It has been proposed to render enzymes water-insoluble, thereby providing a stable material having prolonged enzymatic activity. The insolubilized material may be readily recovered from reaction mixtures, and subsequently reused. Many differing processes have been suggested for stabilization of enzymes by insolubilization.

Examples of such prior art processes include adsorption onto solid materials, such as charcoal, glass and cellulose, entrapment in starch and acrylamide gels and covalent attachment between the enzymes and insoluble organic polymers (natural and synthetic) and inorganic carriers, such as nickel oxide and glass. Additionally, insolubilization has been achieved by forming covalent links between and within enzyme molecules.

These prior art processes, however, suffer from drawbacks, generally associated with the enzymatic activity of the insoluble derivative. In many instances, the enzymatic activity of the derivative is considerably reduced as compared to that of an equivalent amount of the free enzyme. Further, in cases where the enzymatic activity of the derivative is comparable with that of the free enzyme, this activity rapidly is lost upon repeated use. Further, many insolubilizing operations are carried out under conditions which affect adversely the enzymatic activity of the product.

SUMMARY OF INVENTION

The present invention is concerned with an improved process for stabilizing enzymes which provides a material having a considerably enhanced enzymatic life as compared to other insolubilized enzymes and has good enzymatic activity as compared to the free enzyme.

In the present invention, the enzyme is entrapped in a polymeric gel. As indicated above, it has previously been suggested to incorporate enzymes in polyacrylamide gels, but these products do not have a prolonged active life, or good mechanical stability. In contrast, the products of the present invention have good mechanical stability whether wet or dry, may be separated from reaction mixtures by simple filtration, or may be used in a tubular reactor through which the reacting substrate flows.

In accordance with the present invention, there is provided an aqueous reaction mixture containing:

a. water having dissolved or suspended therein an enzyme;
b. at least one water-soluble polymerizable monomer dissolved in the water;
c. at least one cross-linking agent for the monomer(s) soluble in the water-monomer solution;
d. at least one polymer soluble in the reaction mixture; and
e. a free radical initiating system;

and the mixture is polymerized under mild conditions in the substantial absence of oxygen to provide a gel entrapping the enzyme.

The gel so produced may be dried to a free-flowing powder, and subsequently may be swelled for use by the addition of water. The product has excellent enzymatic activity over a prolonged period of time, and exhibits substantially no mechanical degradation or breakdown when used in a column or stirred reactor.

The gel may be provided in any convenient form, typically as a film which then is positioned and used in a suitable reactor.

DESCRIPTION OF PREFERRED EMBODIMENTS

The aqueous reaction mixture used to form the gels in the present invention contains a large proportion of water, the proportion depending to a large extent on the gel strength required. Typically, the reaction mixture contains from 20 to 75% water. The enzyme which is to be entrapped is dissolved in the water. In some instances the enzyme is only partially soluble in the water and a suspension then is provided. Upon formation of the reaction mixture, however, the enzyme generally is dissolved therein.

The quantity of enzyme used may vary widely depending on the particular enzyme and the activity of product required.

The upper limit of quantity of the enzyme generally is dictated by the solubility of the enzyme in the reaction mixture. Typically about 0.01 to 10% by weight of enzyme, based on the weight of the mixture, is included in the reaction mixture, preferably about 0.1 to 5%.

The monomer employed in the reaction mixture may be any desired water-soluble polymerizable monomer, and preferably is a polymerizable monomer containing glycol units which remain in the polymer. Examples of monomers which may be used include hydroxylated esters of acrylic and methacrylic acid, such as 2-hydroxyethylmethacrylate (HEMA). Other hydroxylated esters which may be employed include monomethacrylates or acrylates of glycol, glycerol and other polyhydric alcohols, monomethacrylates or acrylates of dialkylene glycols and polyalkylene glycols.

Many other derivatives of acrylic and methacrylic acid may be used in the reaction mixture, including dimethyl aminoethyl methacrylate, piperidinoethyl methacrylate, morpholinoethyl methacrylate, methacrylyglycolic acid and methacrylic acid itself, and the corresponding acrylic acid derivatives.

Diesters of methacrylic and acrylic acids also may be employed, such as triethanolamine dimethacrylate, triethanolamine trimethacrylate, tartaric acid dimethacrylate, triethylene glycol dimethacrylate, the dimethacrylate of bishydroxyethylacetamide, and the corresponding acrylate derivatives. Other water-soluble polymerizable monomers such as, maleimide, may be employed.

While usually one water-soluble monomer is included in the reaction mixture, if desired a mixture of two or more such monomers may be employed.

The quantity of monomer(s) present depends on the strength of gel required and the solubility of the enzyme in the aqueous reaction mixture. The quantity of monomer present generally varies between about 50% and 200% by weight of the water present. Preferably, substantially equal quantities of monomer and water are used.

A cross-linking agent which is soluble in the water-monomer solution is included to provide cross-linking of the monomer(s) upon polymerization of the reaction medium. Generally, the cross-linking agent is one or more copolymerizable monomers which are soluble in the monomer(s). However, any other desired compatible cross-linking agent may be used, such as N,N'-methylene bisacrylamide.

Typical cross-linking monomers which may be used include methyl acrylate, diethylene glycol dimethacrylate (DDMA), methyl methacrylate, acrylamide, methyl methacrylamide and ethylene glycol dimethacrylate (EDMA).

The presence of the cross-linking agent controls the physical properties of the product gel. The properties which may be varied in this way include increased or otherwise controlled physical strength, controlled water uptake, compatibility with varying solvent systems and control of the microenvironment of the enzyme in the gel.

The quantity of cross-linking agent present depends on the particular monomer system, the cross-linking agent chosen and the extent to which it is desired to control the above-mentioned parameters of the gel. Usually a quantity of cross-linking agent of about 0.1 to about 5%, based on the weight of monomer, is present in the reaction mixture.

A further component of the reaction mixture is a polymer which is soluble in the reaction medium. Any convenient natural or synthetic polymeric material soluble in the system may be used. A mixture of polymers may be used, if desired.

The polymer(s) may be included in the reaction mixture to protect the enzyme during the polymerization of the reaction mixture. Additionally, the polymer may serve to increase the viscosity of the reaction mixture, and hence achieve a more ready polymerization of the mixture to the gel. The presence of the polymer also may affect the properties of the gel and the activity of the enzyme by internal buffering. Both the protection and viscosity increasing functions may be achieved by a single polymer, or a mixture of polymers may be used, one of which performs one function and the other of which performs the other function.

Usually a quantity of polymer of about 0.1 to about 5% by weight based on the weight of monomer is required to achieve the protective effect on the enzyme. To achieve the viscosity increasing function, generally about 1 to about 50% by weight based on the weight of monomer may be employed, preferably about 15 to 25% by weight. The reaction mixture generally contains a polymer or polymers in appropriate quantities to achieve both effects, while retaining solubility in the system.

The total quantity of polymer included in the reaction mixture depends on a number of factors, for example, the monomer system employed, the nature of the enzyme and nature of the polymer itself. Generally, the lower limit is determined by the level below which no benefit is achieved and the upper limit is that above which it is difficult, if not impossible, to dissolve the polymer in the monomer.

The polymeric material may be a polymer of the monomer or a polymer of a different material. Polymers which may be used include poly(2-hydroxyethyl methacrylate), polyvinylpyrollidone, polyethyleneimine, agarose, dextran, albumin, polyacrylamide, polyacrylic acid and polyvinylsulphate.

Free radical initiators are included in the reaction mixture to promote the polymerization of the monomer. The form of the initiator and the quantity employed depends on the nature of the monomer employed, and the reaction temperature to be employed. For example, free radical initiators operative at ambient temperature below about 40° C, preferably around 15° to 25° C, are used, although photochemical free radical initiators operative at temperatures down to −30° C may be used.

Many water-soluble or reaction mixture-soluble enzymes may be entrapped in gels utilizing the present invention and such enzymes include trypsin, catalase, invertase, glucose oxidase, peroxidase, chymo-trypsin and urease. Other enzymes which may be entrapped are glucoamylase, $\beta$-glucosidase, alkaline phosphatase, $\beta$-galactosidase and asparaginase.

In most instances a buffering system is included in the reaction mixture. The particular buffering system employed depends on the enzyme and is chosen to maintain the reaction mixture at the pH closest to the stable pH of the enzyme.

The reaction mixture is subjected to polymerization under mild conditions, in the substantial absence of molecular oxygen. The reaction conditions employed depend on the materials present and especially on the enzyme. Enzymes lose their activity rapidly if subjected to heating and hence the temperature of polymerization generally is maintained below about 37° C and polymerizations may be carried out in accordance with the present invention down to the temperature of freezing of the reaction mixture. Commonly, temperatures between about 0° and about 25° C are employed for the polymerization.

The reaction time involved generally is the minimal time required to ensure a high conversion of monomer to gel polymer without a substantial increase in temperature. Reaction times varying from 1 to 24 hours have been found useful, and the time period following the observation of gel formation is not critical.

It has been found that there is a high degree of conversion of monomer to polymer to provide a gel having entrapped therein the enzyme. The product obtained has a very stable enzymatic activity. The activity of the enzyme would be expected to be degraded rapidly during use, based on the results obtained using polyacrylamide gels, as mentioned above. However, the gels produced in accordance with the present invention exhibit excellent stability of activity on prolonged use.

The gel may be dried to a free-flowing powder and may be stored in this form until it is desired to employ the material. The powder has a long shelf-life, when measured in terms of the enzymatic activity of reconstituted gel. The powder may be swollen to reform the gel, which may be utilized as such in a column or may be provided in membrane form for use.

The thermal denaturation normally associated with enzymes is reduced by incorporation into gels, in accordance with the present invention, thus extending its useful life.

The enzymes entrapped in accordance with the present invention have good enzymatic activity as compared with the free enzyme. Comparison of activity of immobilized enzyme with that of free soluble enzyme is possible, however, only on a phenomenological basis. This can be done by comparing the rate at which the substance is converted to its end product in the presence of the free enzyme and the gel entrapped enzyme. This comparison, however, does not provide a true determination of loss of activity during entrapment, since the reaction conditions are different. Using this comparison, however, it has been observed that a gel entrapped enzyme prepared in accordance with the present invention has between 1 and 30% of the activity of the free enzyme.

The specificity of particular enzymes may be altered bt taking advantage of the diffusion control of the activity of the enzyme, the differing mobilities of large and small substrate molecules, and the ability to vary the tightness of the gel structure by means of the cross-linking monomer.

EXAMPLES

Figure 1:
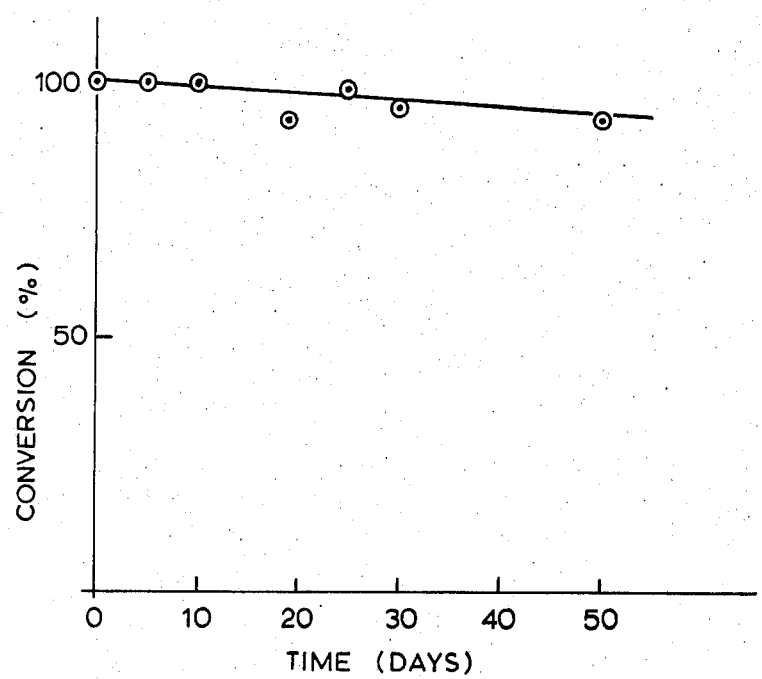
FIG. 1 is a graph showing the activity of a gel prepared in accordance with the present invention, and as described and discussed further in the following Example V.

The invention is illustrated further by the following Examples:

EXAMPLE I — PREPARATION OF A HYDROGEL CONTAINING TRYPSIN

A water soluble polymer of HEMA (s-poly(HEMA)) was prepared by polymerizing a 25% v/v solution of HEMA in dimethylformamide using benzoyl peroxide as an initiator at 100° C in the absence of air. The polymer was purified by precipitation in diethylether.

In an ampule, a solution was prepared containing 200 mg of s-poly(HEMA), 1 ml HEMA containing 2% EDMA, and 1 ml 0.05 M tris (hydroxymethyl) aminomethane (tris) buffer (pH = 8.0). To this solution were added 0.2 ml of a previously prepared solution of 10 mg of purified, crystalline trypsin dissolved in 1 ml of tris buffer and 0.2 ml of a previously prepared solution of 1 ml of di(sec-butyl) peroxydicarbonate (Luperson 225) dissolved in 100 ml of methanol. Air was displaced from the ampule by bubbling nitrogen for 5 minutes and the ampule was then sealed and allowed to polymerize at 27° C for 14 hours. The gel formed was somewhat opaque and was a hard mass which was reduced to small particles by shear action in a Waring blender. The gel was filtered on sintered glass and washed. After washing, the gel was dried at room temperature, pulverized to a fine powder with a mortar, washed with distilled water and stored at room temperature prior to use.

The weight of the dry gel formed was 0.91 gm.

EXAMPLE II — PREPARATION OF A HYDROGEL CONTAINING TRYPSIN AND POLY(VINYL PYROLLIDONE) (PVP)

The procedure of Example I was followed, except that the 200 mg of a s-poly(HEMA) was replaced by 200 mg of poly(vinyl pyrollidone( (PVP) obtained from General Aniline and Film Corporation of molecular weight 40,000.

The weight of the dry gel formed was 0.96 gm.

EXAMPLE III — PREPARATION OF A COPOLYMERIC HYDROGEL CONTAINING TRYPSIN AND POLY(ETHYLENIMINE) (PEI)

The procedure of Example I was followed except that 200 mg of s-poly(HEMA) was replaced by 200 mg of poly(ethylenimine) (PEI) and 100 mg of acrylic acid monomer was also added.

The weight of the dry gel formed was 1.01 gm.

EXAMPLE IV — ESTEROLYTIC ACTIVITY OF HYDROGELS CONTAINING TRYPSIN

Approximately 0.5 gm of a hydrogel prepared as in Examples I, II or III were suspended in a beaker containing 10 ml of tris buffer (pH = 7.9) at 25° C. The pH was adjusted to a stable value of 8.0 by the addition of 0.1N NaOH solution and then 1 ml of a previously prepared ester solution was added. The ester was either p-toluenesulfonyl-L-arginine methylester (TAME) or benzoyl-L-arginine ethyl ester hydrochloride (BAEE) prepared as an 0.1M solution in distilled water.

Additional amounts of 0.1N NaOH were added from time to time to maintain the pH in the range $8.0 \pm 0.1$. The rate of addition of the NaOH is a direct measure of esterolytic activity of the entrapped enzyme. (Gel without enzyme gave no activity). The results of activity measurements for the hydrogels prepared as in Examples I, II and III are summarized in Table 1 below.

The ratio of $k_{TAME}$ to $k_{BAEE}$ of the gels was 1.6 whereas the ratio of free trypsin was 6.8. (It is suggested that the apparent activity towards TAME was reduced because of its relatively slow diffusion through the gel matrix).

TABLE 1

| | a) $k_{BAEE}$ | b) $k_{TAME}$ |
|---|---|---|
| Example I | 0.022 | 0.033 |
| Example II | 0.021 | 0.24 |
| Example III | 0.012 | 0.019 |
| Free Trypsin | 0.38 | 2.5 | a) Ester used was BAEE. The rate constant is defined by ml of 0.1N NaOH added per minutes per 0.5 gm of gel or per mg of free trypsin.
b) Ester used was TAME. The definition of the rate constant is the same as in (a).

EXAMPLE V — STABILITY OF HYDROGELS CONTAINING TRYPSIN

Approximately 0.5 gm of a hydrogel prepared as in Examples I, II or III were placed in a glass chromatographic column, about 1 inch in diameter and 10 cm long, having a sintered glass filter at the bottom, and equipped with a water jacket to keep the temperature constant (25° C). A .001M solution of TAME in 0.05 M tris buffer of pH = 8.0 was run through the column at a flow rate of 1 ml/min. using a pump. The effluent was collected. The absorbance difference at 247 mµ between the effluent solution and the stock solution was measured by a UV spectrometer. The absorbance difference is a direct measure of the extent of the hydrolysis of TAME. The absorbance differences for the hydrogels prepared as in Examples I, II and III were 0.375, 0.375 and 0.247 respectively, which correspond to ester hydrolyses of 100%, 100% and 73% respectively.

The hydrolysis of TAME was continuously carried out on the hydrogel containing trypsin prepared as in Example II at 25° C with a flow rate of 1 ml/min. for 50 days. The gel was both mechanically and enzymatically stable over the period, as is seen in FIG. 1.

EXAMPLE VI — pH DEPENDENCY OF ENZYMATIC ACTIVITY OF THE HYDROGEL CONTAINING TRYPSIN pH dependency of enzymatic activity of the hydrogels prepared as in Examples I and III was measured by using a flow apparatus described in Example V. A .001M solution of TAME in 0.05M tris buffer of pH = 8.0 was run through the column at a flow rate of 2 ml/min. using a pump. The absorbance difference at 247 m$\mu$ between the sample solution and the stock solution was measured by a UV spectrometer.

Figure 2:
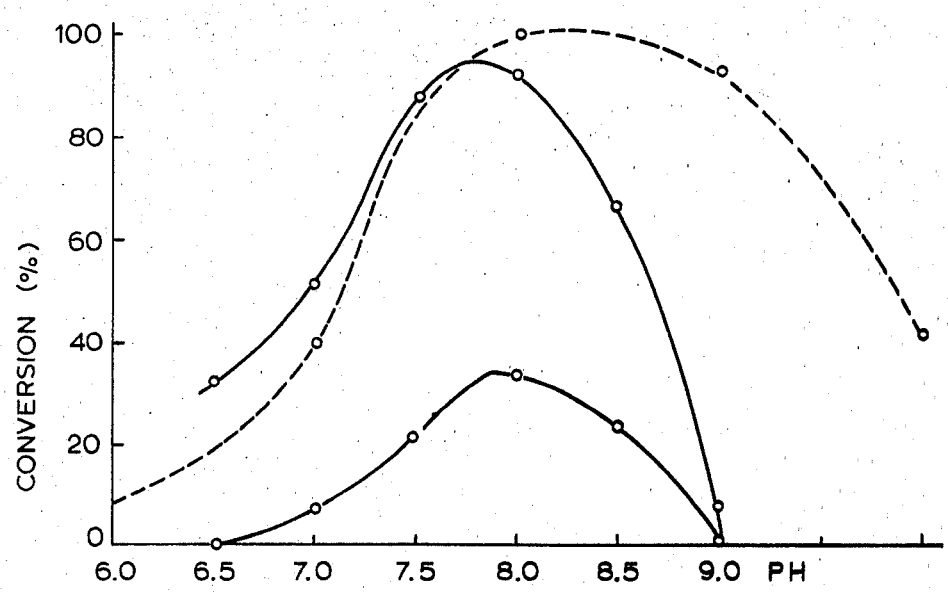
FIG. 2 is a graph showing the pH dependency of enzymatic activity of a gel prepared in accordance with the present invention and as described and discussed further in the following Example VI.

FIG. 2 shows that the activity was maximum at about pH = 8.0 — pH = 7.5. The pH profiles are very similar to that of free trypsin.

EXAMPLE VII — PREPARATION AND USE OF VARIOUS HYDROGELS CONTAINING TRYPSIN 30 mg of bovine albumin were dissolved in 3 ml of 0.05M barbital buffer (pH 8.2) containing 0.01M $CaCl_2$. 2 ml of HEMA containing 2% EDMA, 500 mg PVP, 1 ml enzyme solution (5mg trypsin/ml), and 0.6 ml of a solution of 1% Lupersol 225 dissolved in methanol were added. The resultant solution was placed in an ampule, purged with nitrogen for 10 minutes, sealed and allowed to react at 25° C for 10 hours and 5° C for 17 hours. The gel was removed from the ampule, washed with deionized water and dried in a vacuum. The yield was 77%.

The gel was crushed with a mortar and sieved. Activity of the gel was determined by placing 50 mg gel, particle size 149 to 212 $\mu$m, in a Millipore 13 mm diameter ultrafiltration cell.

10 ml of 5 × $10^{-4}$ N-benzoyl-L-arginine ethyl ester in 0.1M phosphate buffer (pH 8.0) was continuously circulated through the gel and also through an absorption flow-through cell placed in a Varian Techtron UV-Visible Spectrophotometer Model 635. The rate of reaction was followed by recording absorbance at 253 nm. In this apparatus the rate of reaction for free trypsin is 3.3 absorbance units per minute per mg free enzyme. The activity of the gel prepared and measured as described above was 2.0 × $10^{-2}$ absorbance units per minute.

The activity of each of a variety of gels, prepared in a fashion similar to that described above is shown in the following Table II.

TABLE II

TRYPSIN HYDROGELS (Prepared as in Example VIII)

| Gel No. | Monomer | Crosslinking Comonomer(s) | Polymer(s) | Notes on Preparation[a] | % Yield[b] | Activity[c] (Abs/min.) × $10^2$ |
|---|---|---|---|---|---|---|
| T-1 | 2 ml HEMA[z] | 2% EDMA[d] | (500 mg PVP[e] (30 mg albumin | as described in Example VIII | 77 | 2.00 |
| T-2 | 3 ml HEMA | 2% DDMA[f] | 500 mg PVP | at 24°C for 4.5 hours | 12 | 0.70 |
| T-3 | 3 ml HEMA | 2% DDMA | 300 mg agarose | at 24°C for 8 hours | 48 | 0.26 |
| T-4 | 3 ml HEMA | 2% DDMA | 200 mg dextran | at 24°C for 8 hours | 32 | 0.32 |
| T-5 | 2 ml HEMA | (300 mg acrylamide (2% DDMA | 500 mg PVP | at 24°C for 3.5 hours; 3 ml buffer | 18 | 1.30 |
| T-6 | 3 ml HEMA | 2% DDMA | 200 mg agarose | at 24°C for 8 hours | 68 | 0.71 |
| T-7 | 1 ml HEMA | (700 mg acrylamide (2% DDMA | 500 mg PVP | at 24°C for 12 hours; 4 ml buffer | 31 | 0.19 |
| T-8 | 3 ml HEMA | 2% DDMA | 500 mg PVP | at 24°C for 8 hours | 68 | 0.71 |
| T-9 | 3 ml HEMA | 2% DDMA | 500 mg PVP[g] | at 24°C for 6 hours | 43 | 0.86 |
| T-10 | 3 ml HEMA | 2% DDMA | (20 mg albumin (500 mg PVP | at 24°C for 7 hours followed by 12 hours at 5°C | 60 | 1.66 |
| T-11 | 3 ml HEMA | 2% DDMA | 500 mg PVP | same temperature as T-10; only 1.5 ml of buffer used. 1 ml glycerol added | 29 | 1.05 |
| T-12 | 3 ml HEMA | 2% EDMA | 500 mg PVP | same temperature as T-10 | 31 | 1.2 |
| T-13 | 2 ml HEMA | (300 mg acrylamide (2% DDMA | 500 mg PVP | same temperature as T-10 | 71 | 0.62 |
| T-14 | 3 ml HEMA | 2% EDMA | 26 mg of a poly (vinyl crown ether)[h] | same temperature as T-10 | 32 | 0.30 |
| T-15 | 3 ml HEMA | 2% EDMA | (500 mg PVP (20 mg albumin | same temperature as T-10 | 29,31 | 1.34;2.11 |
| T-16 | 3 ml HEMA | 1% EDMA | (500 mg PVP (20 mg albumin | same tempeature as T-10 | 26 | 2.30 |
| T-17 | 3 ml HEMA | 4% EDMA | (500 mg PVP (20 mg albumin | same temperature as T-10 | 30 | 2.02 |
| T-18 | 3 ml HEMA | 2% EDMA | (500 mg PVP (20 mg albumin | 17 hours at 5°C followed by 10 hours at 25°C | 57 | 1.90 |
| T-19 | 3 ml HEMA | 2% EDMA | (500 mg PVP (100 mg albumin | same temperature as T-18 | — | 2.02 |
| T-20 | 3 ml HEMA | 2% EDMA | (500 mg PVP (50 mg ionene 3-3[i] | same temperature as T-18 | 30 | 0.66 |
| T-21 | 3 ml HEMA | (2% EDMA (0.1 ml methylmethacrylate | 500 mg PVP | same temperature as T-18 | 33 | 1.0 |

TABLE II – Continued

TRYPSIN HYDROGELS (Prepared as in Example VIII)

| Gel No. | Monomer | Crosslinking Comonomer(s) | Polymer(s) | Notes on Preparation[a] | % Yield[b] | Activity[c] (Abs/min.) × $10^2$ |
|---|---|---|---|---|---|---|
| T-22 | 3 ml HEMA | 2% EDMA | (500 mg PVP (30 mg albumin | same temperature as T-18; 3 ml buffer | 77 | 1.3 |
| T-23 | 2 ml HEMA | 2% EDMA | (500 mg PVP (30 mg albumin | same temperature as T-22 | 77 | 2.0 |

FOOTNOTES TO TABLE II

[a] Initiator used was 0.6 ml of a solution of 1% of di(sec-butyl) peroxydicarbonate (Lupersol 225) dissolved in methanol. 5 mg enzyme dissolved in 1 ml distilled water and 2 ml of 0.05M barbital pH = 8.2 with 0.01 M $CaCl_2$ were added to monomer-polymer mixture. Polymerized as described above in Example VIII.
[b] % yield of dry gel based on monomer and polymer in reaction mixture
[c] Activity is defined in Example VIII
[d] HEMA = 2-hydroxyethylmethacrylate
[d] EDMA = ethylene glycol dimethacrylate
[e] PVP = polyvinylpyrrolidone of 40,000 molecular weight
[f] DDMA = diethylene glycol dimethacrylate
[g] PVP of 360,000 molecular weight
[h] poly(vinyl benzo-18-crown-6-ether)
[i] 3-3 ionene chloride

EXAMPLE VIII — PREPARATION AND USE OF HYDROGELS CONTAINING L-ASPARAGINASE 10,000 I.U. of E. coli L-asparaginase (Merck Sharp & Dohme Research Laboratories, West Point, Pa.) containing 80 mg of mannitol were dissolved in 5 ml of borate buffer (0.025M, pH 8.1). This solution was added to 4 ml of HEMA containing 4% EDMA. 700 mg PVP and 1.0 ml of a solution of 1% Lupersol 225 dissolved in methanol were added. The pH of the polymerization solution was adjusted to 8.3 by addition of NaOH, the solution was placed in an ampule and nitrogen was bubbled through the solution for 15 minutes. The ampule was sealed and allowed to stand at room temperature for 8 hours and placed at 5° C for 15 hours. The gel was removed from the ampule, washed with deionized water and dried in a vacuum overnight. Yield was 91%.

The gel was tested for activity by first pulverizing the gel to a fine powder with a mortar and sieving. 250 mg of gel with particle size of 149–212 $\mu$m were placed in a chromatographic column. A solution of 1 ml L-asparagine was fed to the column and the extent of reaction was determined by determination of the ammonia content in the effluent using Nerssler's Reagent. It was determined that 720 I.U. of L-asparaginase activity was retained by the hydrogel.

Another asparaginase gel was prepared as above with the addition of 50 mg bovine albumin to the buffer. The polymerization yield was 80% and 1,330 I.U. of activity were retained by the hydrogel.

EXAMPLE IX — PREPARATION AND USE OF HYDROGELS CONTAINING $\beta$-GALACTOSIDASE 30 mg of bovine serum albumin were dissolved in 4 ml of 0.05M phosphate buffer, pH 7.5. 4 ml of HEMA containing 700 mg PVP, 80 mg of N,N'-methylene bisacrylamide, 0.01M $K_2S_2O_8$ and 0.6 ml of a 2% solution of tetramethylene diamine were added. The reaction mixture was adjusted to pH 7.5 by the addition of NaOH and cooled to 0° C in an ice-water bath. One ml of enzyme solution (1.03 mg/ml) was added. The reaction mixture was transferred to an ampule and purged with nitrogen for 10 minutes after which time the ampule was sealed. Polymerization was allowed to proceed at 0° C for 10 hours. The gel then was removed from the ampule, washed with distilled water, dried in vacuum at 25° C, crushed in a mortar and sieved. The yield of polymer was found to be 96%.

The activity of the gel was determined by placing 50 mg (particle size 75 to 106 $\mu$m) in a Millipore 13 mm diameter ultrafiltration cell. 10 ml of $10^{-3}$M o-nitrophenyl $\beta$-D-galactopyranoxide in 0.05M phosphate buffer, pH 7.50 and ionic strength of 0.10M (adjusted with NaOH and NaCl) were circulated through the gel and then through a flow-through cell placed in a Varian Techtron UV-Visible Spectrophotometer Model 635. The rate of reaction was followed by recording the absorbance at 410 nm. The rate of reaction for free $\beta$-galactosidase was found to be 25.4 $\mu$moles per minute per mg free enzyme in the apparatus, while the rate for the enzyme in the gel was 0.092 adsorbance units per minute per mg enzyme, i.e., 6.2 $\mu$moles per minute per mg of enzyme, indicating a 25% retention of activity.

EXAMPLE X — PREPARATION OF A HYDROGEL CONTAINING INVERTASE

In an ampule, a solution was prepared containing 200 mg s-poly(HEMA), 1 ml HEMA containing 2% EDMA and 1 ml of 0.2M citrate buffer (pH 5.0). To this solution were added 0.2 ml of a previously prepared solution of 8 mg of invertase (Sigma Chemical Co., grade VI) dissolved in 0.5 ml of 0.2M citrate buffer and 0.2 ml of a previously prepared solution of 1 ml of Lupersol 225 dissolved in 100 ml of methanol. The polymerization procedure and processing procedure described in Example I were followed.

The weight of the dry gel formed was 0.90 gm.

EXAMPLE XI — ACTIVITY AND STABILITY OF A HYDROGEL CONTAINING INVERTASE 0.5 gm of invertase gel prepared in accordance with Example X was placed in a water jacketed column as in Example V and a .001M solution in 0.1M acetate buffer of pH 4.9 was run by a pump through the column. Glucostat special colour reagent (Worthington Biochemical Corporation) was used to determine effluent glucose concentration. The absorbance of glucostat reagent was measured on a spectrophotometer at 415 m$\mu$. At a flow rate of 0.35 ml/min. and a column temperature of 50° C the percentage conversion of sucrose to glucose was determined to be 17%, 12% and 15%. These values correspond to measurements made in 26 days, 35 days and 36 days after the gel was prepared. the gel was stored at room temperature in an 0.1M acetate buffer solution (pH = 4.9) between activity determinations.

EXAMPLE XII — PREPARATION AND USE OF A HYDROGEL CONTAINING CATALASE

In an ampule a solution was prepared containing 200 mg S-poly(HEMA), 1 ml HEMA containing 2% EDNA and 1 ml of 0.05M phosphate buffer (pH = 7.0). To this solution were added 0.2ml of a previously prepared solution of 0.1 ml catalase suspension (Sigma Chemical Co., 50 mg enzyme/ml), 0.4 ml of 0.5M phosphate buffer, and 0.2 ml of a previously prepared solution of 1 ml of Lupersol 225 dissolved in 100 ml of methanol. The polymerization procedure and processing procedure described in Example I were followed. The weight of the dry gel formed was 0.87 gm.

The gel was tested for activity by placing 0.5 gm of the gel into 50 ml of an 0.6% $H_2O_2$ solution buffered at pH = 7.0 with 0.05M phosphate buffer. Absorbance was followed with a spectrophotometer at 240 m$\mu$. Upon addition of gel, absorbance was reduced by 10% within 1 minute and the formation of small bubbles on the gel particles was observed. No further reduction of $H_2O_2$ was observed over a 5½ hour period.

EXAMPLE XIII — PREPARATION OF A HYDROGEL CONTAINING GLUCOSE OXIDASE

A solution was prepared containing 200 mg of a s-poly(HEMA), 1 ml HEMA containing 2% EDMA and 1.0 ml of 0.1M acetate buffer (pH = 4.9) in an ampule. 0.4 ml of a previously prepared solution of 5.8 mg of glucose oxidase (NB Co. grade pure) dissolved in 1 ml of acetate buffer and 0.2 ml of a previously prepared solution of 1 ml of Lupersol 225 dissolved in 100 ml of methanol were added. The polymerization procedure and processing procedure described in Example I were followed with the exception that the polymerization time was 40 hours. The gel produced had a whitish colour.

The weight of the dry gel was 0.98 gm.

EXAMPLE XIV — ACTIVITY AND STABILITY OF A HYDROGEL CONTAINING GLUCOSE OXIDASE 0.5 gm of the glucose oxidase gel prepared as in Example XIII was placed in a water jacketed column as in Example V and a .01M solution of glucose in 0.1M acetate buffer of pH = 5.0 was run by a pump through the column. The concentration of $H_2O_2$ in the effluent was determined by addition of an indicator solution of 20 mg of o-toluidine 2HCl and 0.8 mg peroxidase (Sigma Chemical Co., Type II) per 100 ml of 0.1M acetate buffer. Absorbances were measured at 410 m$\mu$ on a spectrophotometer. At a flow rate of 1 ml/min. and a column temperature of 35°C measurements of gel activity were made 12 and 14 days after the gel was prepared. In both cases the oxidation of glucose was complete. It was observed that addition of free glucose oxidase to the effluent produced no additional $H_2O_2$.

EXAMPLE XV — PREPARATION AND ACTIVITY OF HYDROGELS CONTAINING GLUCOSE OXIDASE

A solution was prepared containing 3 gms PVP, 10 ml HEMA, 9 ml. of 0.1M phosphate buffer, (pH = 8.0) and 0.2 ml DDMA.

6 ml of a previously prepared solution of 200 mg of glucose oxidase dissolved in 10 ml phosphate buffer was added.

To this solution, 1.5 ml of a previously prepared solution of 1 ml of Lupersol 225 dissolved in 100 ml methanol was added. The reaction mixture was transferred to an ampule and the air was displaced from the ampule by bubbling nitrogen for 5 minutes. The ampule was then sealed and allowed to polymerize for 2 hours at 25°C followed by 18 hours at 5°C and then by 3 hours at 25°C. Gel formed is a uniform soft mass, somewhat elastic, yellowish in colour.

The gel was reduced to small particles by shear action in a Waring blender. After washing the gel was dried at room temperature under vacuum, pulverized to a fine powder with a mortar and separated according to the particle size.

1 gm of the above glucose-oxidase gel of particle size between 200 to 150$\mu$ was placed in a reactor equipped with a stirring rod. 13 ml of air-saturated 0.1M acetate buffer, pH 5.6, was added and an oxygen analyzer (Beckman, Model 755) was adjusted to indicate air-saturated solution, under constant stirring rate.

To the reaction chamber 2 ml of a previously prepared 100 mg/ml D-glucose solution was added and the rate of depletion of oxygen was followed.

The activity of gel in units/gm was calculated as 3.24.

A unit is defined as the amount of enzyme which would oxidize 1$\mu$ mole of glucose per minute.

Gels showed excellent stability at room temperature and no loss in activity after being used for 250 runs over a ten day period.

A variety of gels was prepared and their activity similarly analyzed; the results are reproduced in the following Table III:

TABLE III

| Gel No. | GLUCOSE OXIDASE HYDROGELS | | | | | | | | Activity [e] (units/gm) |
|---|---|---|---|---|---|---|---|---|---|
| | Monomer | Comonomer(s) | Polymer(s) | Buffer [a] ml | Enzyme [b] ml | Initiator [c] ml | Notes on Preparation | % Yield [d] | |
| G-1 | 10 ml HEMA [f] | 0.2 ml DDMA [g] | 3 gms PVP [h] | 9 | 6 | 1.5 | 2 hours at 25°C followed by 18 hours at 5°C followed by 3 hours at 25°C | 62 | 3.24 |
| G-2 | 10 ml HEMA | 0.3 ml DDMA | 2.5 gm PVP | 9 | 6 | 1.5 | same temperature as G-1 | 58 | 3.12 |
| G-3 | 10 ml HEMA | 0.3 ml DDMA | 2.5 gm PVP | 9 | 6 | 1.5 | 20 hours at 25°C | 63 | 3.65 |
| G-4 | 3.6 ml HEMA | 0.08 ml DDMA | 0.15 gm PVP | 4.3 | 1 | 0.4 | 2 hours at 25°C followed by 23 hours at 5°C | 60 | 2.00 |
| G-5 | 30 ml HEMA | 0.9 ml DDMA | 7.5 gm PVP | 27 | 18 | 4.5 | 24 hours at 25°C | 95 | 3.70 |
| G-6 | 3.6 ml HEMA | .08 ml DDMA | 0.15 gm agarose | 4.3 | 1 | 0.4 | 24 hours at 5°C followed by 2 hours at 25°C | 64 | 4.50 |
| G-7 | 3.6 ml HEMA | .08 ml DDMA | 0.15 gm dextran | 4.3 | 1 | 0.4 | same temperature as G-6 | 64 | 3.20 |
| G-8 | 3.6 ml HEMA | .08 ml DDMA | 0.15 gm polyacrylamide | 4.3 | 1 | 0.4 | same temperature as G-6 | 51 | 5.65 |

TABLE III—Continued

GLUCOSE OXIDASE HYDROGELS

| Gel No. | Monomer | Comonomer(s) | Polymer(s) | Buffer[a] ml | Enzyme[b] ml | Initiator[c] ml | Notes on Preparation | % Yield[d] | Activity[e] (units/gm) |
|---|---|---|---|---|---|---|---|---|---|
| G-9 | 3.6 ml HEMA | .08 ml DDMA | 0.15 gm polyacrylicacid | 4.3 | 1 | 0.4 | same temperature as G-6 | 55 | 3.10 |
| G-10 | 3.6 ml HEMA | .08 ml DDMA | 0.15 gm albumin | 4.3 | 1 | 0.4 | same temperature as G-6 | 97 | 1.95 |
| G-11 | 3.1 ml HEMA | 0.1 ml DDMA | 0.31 gm PVP | 3.7 | 1 | 0.4 | same temperature as G-6 | 99 | 2.15 |
| G-12 | 3.1 ml HEMA | 0.1 ml EDMA[i] | 0.31 gm PVP | 3.7 | 1 | 0.4 | same temperature as G-6 | 99 | 1.60 |
| G-13 | 3.1 ml HEMA | 0.08 ml DDMA | 0.31 gm PVP | 3.7 | 1 | 0.4 | same temperature as G-6 | 99 | 1.75 |
| G-14 | 3.1 ml HEMA | 0.08 ml EDMA | 0.31 gm PVP | 3.7 | 1 | 0.4 | same temperature as G-6 | 99 | 1.60 |
| G-15 | 4 ml HEMA | (.08 ml DDMA (0.5 ml acrylamide | 0.6 gm PVP | 4.8 | 1 | 0.4 | same temperature as G-6 | 93 | 3.20 |
| G-16 | 4 ml HEMA | .08 ml DDMA | 0.6 gm PVP | 4.8 | 1 | 0.4 | same temperature as G-6 | 94 | 3.30 |
| G-17 | 10 ml HEMA | 0.2 ml DDMA | 3.5 gm PVP | 5 | 6 | 2 | 1 hour at 25°C followed by 15 hours at 5°C followed by 3 hours at 25 C | 85 | 1.40 |
| G-18 | 1.5 ml HEMA | .03 ml DDMA | 0.3 gm PVP | 0.5 | 1.5 | 0.3 | same temperature as G-17 | 80 | 0.52 |
| G-19 | 3 ml HEMA | .06 ml DDMA | 0.6 gm PVP | 3.5 | 1.0 | 0.6 | same temperature as G-17 | 78 | 1.1 |
| G-20 | 1.5 ml HEMA | .03 ml DDMA | 0.3 gm PVP | 4 | 1.0 | 0.3 | same temperature as G-17 | 52 | 0.9 |

[a] Buffer was 0.1M phosphate, pH 8.0.
[b] Enzyme was 20 mg of glucose oxidase (18,000 I.U./mg) dissolved per ml of buffer phosphate (0.1m pH = 8.0).
[c] Initiator was a solution of 1% Lupersol 225 in methanol.
[d] Percent yield of dry gel based on monomer plus polymer.
[e] Activity is defined in Example XV.
[f] HEMA = 2-hydroxyethylmethacrylate.
[g] DDMA = diethylene glycol dimethacrylate.
[h] PVP = polyvinylpyrollidone, of 40,000 molecular weight.
[i] EDMA = ethylene glycol dimethacrylate.

EXAMPLE XVI — STABILITY OF HYDROGEL CONTAINING GLUCOSE OXIDASE

In the reactor described in Example XV 300 mg of the gel containing glucose oxidase was incubated in acetate buffer (pH = 5.6) for varying time periods at a particular temperature. The gel activity was measured as described in Example XV and the time required to decrease the gel activity to one half its initial value was noted. Similar experiments were done on the free and soluble glucose oxidase enzyme. The results shown in the following Table IV indicate the enhanced stability of the gel entrapped enzyme over the free enzyme.

TABLE IV

| Temperature | TIME TO HALVE ACTIVITY OF GLUCOSE OXIDASE | |
|---|---|---|
| | Gel Entrapped | Free, Soluble |
| 25°C | more than 250 hr. | |
| 35°C | 24 | 13.5 |
| 45°C | 10 | 2.5 |
| 50°C | 5 | 0.15 |

It will be apparent therefore that the present invention provides a practical manner of stabilization of an enzyme to provide a gel product having a prolonged enzymatic activity.

Modifications are possible within the scope of the present invention.

What we claim is:

1. An enxymatically active substantially insoluble gel formed by polymerizing to a gel under mild conditions in the absence of molecular oxygen a reaction mixture containing
   a. water in a quantity of from about 20 to about 75% by weight of said reaction mixture,
   b. at least one water-soluble polymerizable monomer dissolved in the water at least a major proportion of which is a glycol unit containing monomer selected from the group consisting of monomethacrylates of glycol, monomethacrylates of polyhydric alcohols, monoacrylates of glycol, monoacrylates of polyhydric alcohols, monomethacrylates of dialkylene glycols, monomethacrylates of polyalkylene glycols, monoacrylates of dialkylene glycols and monoacrylates of polyalkylene glycols, the quantity of said monomer being from about 50% to about 200% by weight of the quantity of water,
   c. at least one cross-linking agent for said at least one monomer soluble in the water-monomer solution,
   d. at least one polymer soluble in the reaction mixture and selected from the group consisting of polymers of a glycol unit containing monomer selected from the group consisting of monomethacrylates of glycol, monomethacrylates of polyhydric alcohols, monoacrylates of glycol, monoacrylates of polyhydric alcohols, monomethacrylates of dialkylene glycols, monomethacrylates of polyalkylene glycols, monoacrylates of dialkylene glycols and monoacrylates of polyalkylene glycols, polyvinylpyrrolidone, poly(ethyleneimine), albumin, agarose, dextran, poly(vinyl crown ether), polyacrylamide, polyacrylic acid, polyvinylsulphate and mixtures of at least two of such polymers, said polymer being present in a quantity of from about 1 to about 50% by weight of the monomer,
   e. a free radical initiating system, and
   f. an enzyme dissolved in said mixture.

2. The gel of claim 1, wherein said enzyme is present in an amount of from 0.01 to 10% by weight of said mixture.

3. The gel of claim 2 wherein said enzyme is present in an amount of from 0.1 to 5% by weight of said mixture.

4. The gel of claim 1 wherein said monomer is 2-hydroxyethyl-methacrylate.

5. The gel of claim 1 wherein said cross-linking agent is a cross-linking monomer copolymerizable with said water-soluble monomer.

6. The gel of claim 5 wherein said cross-linking monomer is diethylene glycol dimethacrylate or ethylene glycol dimethacrylate.

7. The gel of claim 1 wherein said cross-linking agent is present in an amount of about 0.1 to about 5% by weight of the monomer.

8. The gel of claim 1 wherein the polymer is present in an amount from about 15 to 25% by weight.

9. The gel of claim 1 wherein said polymer is poly.(2-hydroxyethylmethacrylate).

10. The gel of claim 1 wherein said monomer(s) and cross-linking agent are selected from the combinations of the group consisting of 2-hydroxyethylmethacrylate and ethylene glycol dimethacrylate; 2-hydroxyethylmethacrylate and diethylene glycol dimethacrylate; 2-hydroxyethylmethacrylate, acrylamide and diethylene glycol dimethacrylate; 2-hydroxyethylmethacrylate; ethylene glycol dimethacrylate and methyl methacrylate; and 2-hydroxyethylmethacrylate and N,N'-methylene bis acrylamide.

11. The gel of claim 1 wherein the quantity of monomer present in said reaction mixture is approximately the same as the quantity of water.

12. A dry powdered product capable of swelling with water to provide a substantially insoluble gel of enzymatic activity, said product being formed by drying and particulating an enzymatically active gel formed by polymerizing to a gel under mild conditions in the absence of molecular oxygen a reaction mixture containing a. water in a quantity of about 20 to about 75% by weight of said reaction mixture,
b. at least one water-soluble polymerizable monomer dissolved in the water at least a major proportion of which is a glycol unit containing monomer selected from the group consisting of monomethacrylates of glycol, monomethacrylates of polyhydric alcohols, monoacrylates of glycol, monoacrylates of polyhydric alcohols, monomethacrylates of dialkylene glycols, monomethacrylates of polyalkylene glycols, monoacrylates of dialkylene glycols and monoacrylates of polyalkylene glycols, the quantity of said monomer being from about 50% to about 200% by weight of the quantity of water,
c. at least one cross-linking agent for said at least one monomer soluble in the water-monomer solution,
d. at least one polymer soluble in the reaction mixture and selected from the group consisting of polymers of a glycol unit containing monomer selected from the group consisting of monomethacrylates of glycol, monomethacrylates of polyhydric alcohols, monoacrylates of glycol, monoacrylates of polyhydric alcohols, monomethacrylates of dialkylene glycols, monomethacrylates of polyalkylene glycols, monoacrylates of dialkylene glycols and monoacrylates of polyalkylene glycols, polyvinylpyrrolidone, poly(ethyleneimine), albumin, agarose, dextran, poly(vinyl crown ether), polyacrylamide, polyacrylic acid, polyvinylsulphate and mixtures of at least two of such polymers, said polymer being present in a quantity of from about 1 to about 50% by weight of the monomer,
e. a free radical initiating system, and
f. an enzyme dissolved in said mixture.

13. A process for the stabilization of an enzyme which comprises forming a homogeneous reaction mixture by mixing together a. water in a quantity of from about 20 to about 75% by weight of said reaction mixture,
b. at least one water-soluble polymerizable monomer dissolved in the water at least a major proportion of which is a glycol unit containing monomer selected from the group consisting of monomethacrylates of glycol, monomethacrylates of polyhydric alcohols, monoacrylates of glycol, monoacrylates of polyhydric alcohols, monomethacrylates of dialkylene glycols, monomethacrylates of polyalkylene glycols, monoacrylate, of dialkylene glycols and monoacrylates of polyalkylene glycols, the quantity of said monomer being from about 50% to about 200% by weight of the quantity of water,
c. at least one cross-linking agent for said at least one monomer soluble in the water-monomer solution,
d. at least one polymer soluble in the reaction mixture and selected from the group consisting of polymers of a glycol unit containing monomer selected from the group consisting of monomethacrylates of glycol, monomethacrylates of polyhydric alcohols, monoacrylates of glycol, monoacrylates of polyhydric alcohols, monomethacrylates of dialkylene glycols, monomethacrylates of polyalkylene glycols, monoacrylates of dialkylene glycols and monoacrylates of polyalkylene glycols, polyvinylpyrrolidone, poly(ethyleneimine), albumin, agarose, dextran, poly(vinyl crown ether), polyacrylamide, polyacrylic acid, polyvinylsulphate and mixtures of at least two of such polymers, said polymer being present in a quantity of from about 1 to about 50% by weight of the monomer,
e. a free radical initiating system, and
f. an enzyme dissolved in said mixture and polymerizing said mixture under mild conditions in the absence of molecular oxygen to a substantially insoluble gel.

14. The process of claim 13 wherein said mixture is polymerized at a temperature of about 0° to about 25°C.

15. The process of claim 13 wherein said enzyme is trypsin.

16. The process of claim 13 wherein said enzyme is catalase.

17. The process of claim 13 wherein said enzyme is invertase.

18. The process of claim 13 wherein said enzyme is glucose oxidase.

19. The process of claim 13 wherein said enzyme is peroxidase.

20. The process of claim 13 wherein said enzyme is chymo-trypsin.

21. The process of claim 13 wherein said enzyme is urease.

22. The process of claim 13 wherein said enzyme is glucoamylase.

23. The process of claim 13 wherein said enzyme is β-glucosidase.

24. The process of claim 13 wherein said enzyme is alkaline phosphatase.

25. The process of claim 13 wherein said enzyme is β-galactosidase.

26. The process of claim 13 wherein said enzyme is asparaginase.

* * * * *

UNITED STATES PATENT OFFICE
CERTIFICATE OF CORRECTION

Patent No. 3,859,169      Dated January 7, 1975

Inventor(s) Kenneth F. O. Driscoll

It is certified that error appears in the above-identified patent and that said Letters Patent are hereby corrected as shown below:

Column 2, line 54, change "methacryly-" to read
-- methacryl- --.

Column 7, line 23, after "Example V" and before the period, insert "and is plotted in Figure 2, the upper and lower solid curves being obtained with the hydrogels of Examples I and III respectively";

Column 7, line 31, after "trypsin" insert "represented by the broken line curve of Figure 2";

In the heading to Table II in columns 7 and 8, the numeral "VIII" should read -- VII --;

Column 5 of Table II, line 1, "VIII" should read -- VII --;

Columns 9 and 10, Table II, line 3 of column 5, "T-22" should read -- T-18 --;

Column 10, line 23, "galactopyranoxide" should read -- galactopyranoside"

UNITED STATES PATENT OFFICE
CERTIFICATE OF CORRECTION

Patent No. 3,859,169  Dated January 7, 1975

Inventor(s) Kenneth F. O. Driscoll

It is certified that error appears in the above-identified patent and that said Letters Patent are hereby corrected as shown below:

Column 10, line 56, insert "of sucrose" after "solution"

Columns 13 and 14, footnote B to Table III "0.1m" should read -- 0.1M --

Signed and sealed this 8th day of April 1975.

(SEAL)
Attest:

RUTH C. MASON
Attesting Officer

C. MARSHALL DANN
Commissioner of Patents
and Trademarks